March 16, 1926.
F. GEISS
1,576,729
ILLUMINATING GAS BLOWPIPE
Filed March 30, 1925
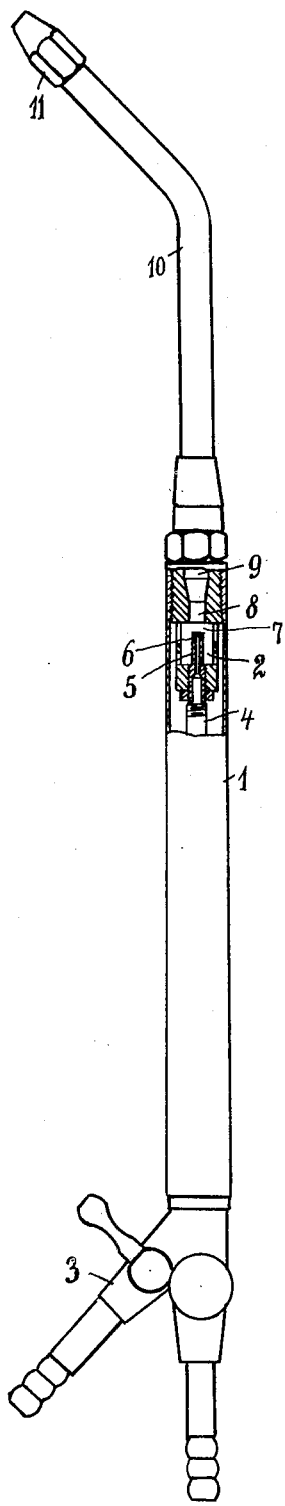
Inventor:
Franz Geiss
by [signature]
Attorney Patented Mar. 16, 1926.

1,576,729

UNITED STATES PATENT OFFICE.

FRANZ GEISS, OF NEUKOLLN, NEAR BERLIN, GERMANY, ASSIGNOR TO THE FIRM OEL-TANKS GESELLSCHAFT M. B. H., OF BERLIN, GERMANY.

ILLUMINATING-GAS BLOWPIPE.

Application filed March 30, 1925. Serial No. 19,431.

*To all whom it may concern:*

Be it known that I, FRANZ GEISS, a citizen of the State of Prussia, Germany, residing at Neukolln, near Berlin, in the county of Brandenburg and State of Prussia, Germany, have invented certain new and useful Improvements in Illuminating-Gas Blowpipes, of which the following is a specification.

The invention relates to improvements in autogenous welding and cutting burners in which lighting-gas is used as heating gas which is sucked in by the oxygen supplied into the burner. It has already been tried to use coal gas especially lighting-gas instead of acetylene for the purpose of welding and cutting. The trials were not successful owing to the fact that it was not possible to obtain the necessary welding and cutting flame with the burners used. In these burners the heating gas is sucked into the mixing chamber through a gradually contracted ring-shaped tube, in which a great deal of the gas pressure and the dynamical effect of the oxygen is previously wasted before the gas reaches the inlet of the mixing tube, in which the oxygen and the gas are mixed. If the oxygen pressure is raised in order to produce a stronger suction-effect, the oxygen influx increases whereby a useless mixture is generated.

The objects of the improvement are to eliminate the said inconveniences and to provide a burner in which the average oxygen pressure of 1.5–2 atm. is sufficient to produce the suction of the proper quantity of lighting gas which guarantees a perfect welding and cutting flame. It has been found that the quantity of gas supplied is not merely a function of the oxygen-pressure but also a function of the proportion of the oxygen-tube diameter to the diameter of the mixing-chamber.

One form of the invention is illustrated in the accompanying drawing, in which the figure is an elevation and partly a vertical section of the burner.

The burner comprises a handle 1 containing a lighting-gas chamber 2 to which is attached the gas supply-pipe 3. Within the gas chamber 2 is arranged a nozzle 5 connected with a tube 4 through which oxygen is supplied. The nozzle 5 has an outlet 6 projecting into the final portion 7 of the chamber 2. The final portion 7 forms a non-contracted gas-sucking chamber prolongated beyond the said mouth-piece 6. At the end of the final portion 7 of the chamber 2, the inlet 8 of a mixing tube 9 is arranged opposite and in line with the outlet of the said oxygen tube 4. The mixing tube 9 is connected by means of a blowpipe 10 with the nozzle 11 of the burner.

The lighting-gas is supplied through the pipe 3 into the chamber 2 and may pass through the non-contracted end portion 7 of the chamber to the inlet 8 of the mixing chamber 9. According to this invention, the dimension of the inlet is put in a distinct proportion to the dimension of the outlet 6 of the oxygen tube. Both openings have a circular shape. The diameter of the inlet 8 forming a passage between the chamber portion 7 and the mixing tube 9 is made approximately equal to the quintuple of the diameter of the oxygen tube-outlet 6, through which the oxygen is supplied under a pressure of 1.15–2 atm. Between the openings 6 and 8, the chamber portion 7 comprises in its new shape an enlarged room through which the gas is accelerated by means of the oxygen-jet, and the oxygen-jet produces a suction-effect so as to draw the proper quantity of lighting-gas through the chamber-portion 7 into the passage 8 of the mixing tube 9 whence the mixture of gas and oxygen is led to the burner-nozzle 11.

By the novel construction, in which the diameter of the inlet of the mixing chamber has a proper or approximate proportion to the diameter of the oxygen outlet like 5:1, it is attained that the usual oxygen pressure of 1.5–2 atm. is sufficient to suck strictly the quantity of lighting-gas necessary for generating in mixture with the oxygen a perfect welding or cutting flame. Preferably the openings 6 and 8 are bored originally in such a way that the said proportion will be obtained, but other ways of securing the stated proportion, within the scope of the appended claim, may be employed.

I claim:

An illuminating gas welding and cutting blow-pipe comprising a handle having oxygen and illuminating gas supply pipes, a mixing tube removably seated in said handle, a sleeve at the inner end of said mixing tube forming the wall of a central illuminating gas aspirating chamber, said sleeve being spaced from the inner wall of said handle and having openings formed through its wall, a nozzle removably secured in the inner end of said sleeve and spaced from the wall thereof, forming an annular illuminating gas passage delivering into said central aspirating chamber between said nozzle and mixing tube, an oxygen supply pipe connected with said nozzle, the diameter of said annular illuminating gas passage being the quintuple of the diameter of the outlet of the said oxygen nozzle.

In testimony whereof I have signed my name to this specification.

FRANZ GEISS.